United States Patent Office 2,929,827
Patented Mar. 22, 1960

2,929,827

LACTONE ADDUCTS

Thomas F. Carruthers, South Charleston, W. Va., assignor to Union Carbide Corporation, a corporation of New York No Drawing. Application April 27, 1956
Serial No. 581,011

20 Claims. (Cl. 260—405)

This invention relates to lactone adducts that are useful as plasticizers in vinyl and other resins, and to a method of preparing such esters.

A number of plasticizers for vinyl resins, cellulose derivatives, and the like, have been known for some time, di(2-ethylhexyl) phthalate being among the relatively non-volatile esters of simple molecular structure known for this purpose. While esters of this type possess a number of important advantages as resin plasticizers, the combinations of resin and plasticizer leave something to be desired in so far as permanence is concerned, since gradual loss of plasticizer occurs by evaporation or by extraction with liquids which may come into contact with the plasticized resin. Thus, for example, shower curtains of plasticized resin tend to lose plasticizer by water extraction. Furthermore, the simple ester plasticizers are active solvents for many substances and tend to migrate from the plasticized article to other materials which come into contact with it.

In accordance with the preferred embodiment of the invention, lactones are reacted with hydroxy acid esters to form adducts having one or more terminal hydroxy groups that are eminently suitable as plasticizers in various resins, e.g., copolymers of vinyl chloride and vinyl acetate, natural rubber, GRS rubber, copolymers of acrylonitrile with ethylenically unsaturated compounds such as butadiene, polyvinyl butyral and polyvinyl chloride, nitrocellulose and the like. These adducts can, if desired, be acylated to insolubilize the terminal hydroxyl groups and thus further improve their resistance to extraction by water from resins with which they are combined.

The lactone used as a starting material may be any lactone, or combination of lactones, having at least six carbon atoms in the ring and represented by the general formula:

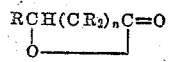

in which $n$ is at least four, at least $n+2$ R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

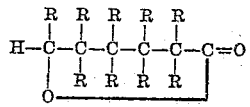

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxy-hexanoic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms of the lactone are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be reacted in accordance with the method of the invention.

The hydroxy acid esters that are suitable for reaction with the lactone or mixture of lactones in the method of the invention typically include:

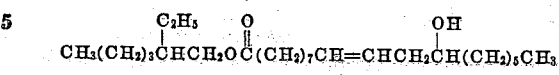

the 2-ethylhexyl ricinoleate,

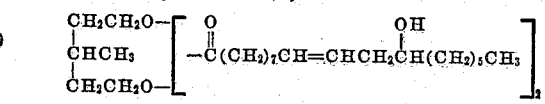

3-methyl-1,5-pentanediol diricinoleate,

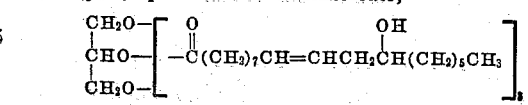

glyceryl ricinoleate or castor oil,

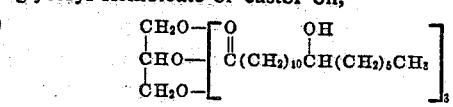

glyceryl tri-12-hydroxystearate, and

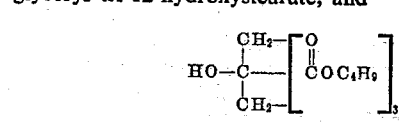

tributyl citrate.

It is believed that the hydroxyl groups open and add on lactone rings to form ester groups having new terminal hydroxyl groups, as represented for example by the equation:

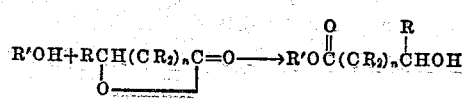

in which R' stands for a hydroxy ester residue, and that any of the new terminal hydroxyl groups are in turn capable of opening and adding on one or more excess lactone rings:

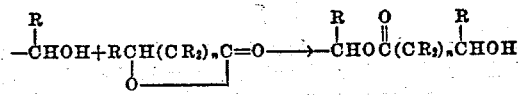

The adducts obtainable by reacting one or more lactones with a hydroxy ester in accordance with the invention may therefore be conveniently represented by the general formula $$R'(OL_xH)_y$$

in which L is a substantially linear group having the formula

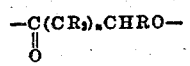

in which $n$ is at least four, at least $n+2$ R's are hydrogen, the remaining R's are substituents selected from the group consising of hydrogen, alkyl, cycloalkyl, alkoxy and single ring aromatic hydrocarbon radicals, and the total number of carbon atoms in the substituents on a given group does not exceed about twelve; R' is a residue of a hydroxy acid ester; $x$ is an average of at least one; and $y$ corresponds to the number of hydroxyl groups on the initial hydroxy ester and is at least one.

Generally, it is desirable that the molar proportions of the lactone and the hydroxy ester reactants be related approximately to the number of hydroxyl groups. When using a glyceride containing three hyrdoxyl groups, for example, the molar ratio of lactone to glyceride should be at least about 3:1 and preferably somewhat higher, unless special effects are desired. The average molecular weight of the adducts may be controlled, as will readily be understood by those skilled in the art, by selection of the particular starting materials as well as by adjustment of the molar ratio of the lactone to the ester. Thus, for example, molar ratios of lactone in excess of the amount equivalent to the number of hydroxyl groups will result in higher molecular weight adducts having chains each containing several lactone residues.

The reaction is carried out by heating the mixed reactants to a temperature between about 100 and 250° C. for a time sufficient to complete the reaction, as readily indicated by the refractive index, which reaches a maximum when the reaction is complete. If desired, the reaction may be accelerated and carried out at somewhat lower temperatures by admixing with the reactants a minor proportion, e.g., as little as 0.1 up to about 2% by weight of the total charge, of catalyst. Suitable catalysts include organic acids such as acetic acid, propionic acid, 2-ethylhexanoic acid, and the like, mineral acids, bases such as sodium methylate, the various ester interchange catalysts, and organic metal compounds including particularly organic tin oxides, titanates, chelates and acylates. After completion of the reaction, low boiling materials may be stripped from the adduct by heating it at reduced pressure.

The lactone adducts thus formed are excellent plasticizers and are compatible as such in vinyl and other resins and elastomers. In order, however, to make them more miscible with vinyl chloride resins, for example, and to reduce their loss from such resins by water extraction, the adducts are preferably acylated by reacting, at elevated temperature, the terminal hydroxyl groups with excess acylating agent. Anhydrides such as acetic anhydride and propionic anhydride are preferred over acids because of their ability to react at lower temperatures and their consequently lesser tendency to favor decomposition of the polyester or other side reactions such as ester rearrangement. After completion of the acylation, low boiling materials may again be stripped from the acylated adduct by heating it at reduced pressure.

The non-acylated and acylated adducts obtained in accordance with the preferred embodiment of the invention may conveniently be represented by the general formula $$R'(OL_xY)_y$$

in which Y is —H or acyl and the remaining symbols are as indicated previously.

The concentration of a lactone adduct of the invention as a plasticizer in a resin may vary widely, depending upon the particular results desired. Low concentrations, e.g., as low as about 5% by weight, are employed as processing aids in rigid compositions rather than for plasticizing action. Higher concentrations up to about 50% or even more are used when flexibility is the overriding desideratum.

The method of the invention and the utility of the products obtained thereby will become further apparent from the following detailed examples included to illustrate the best modes presently contemplated for carrying out the invention. In these examples, the acidity is reported in terms of the number of cc. of normal base required to neutralize one gram of ester and the hydroxyl value is reported in terms of percent OH as determined by a modification of the acetic anhydride-pyridine method, similar to that described in Ind. Eng. Chem. Anal. Ed., vol. 17, pages 394–97. The course of the reaction between the lactone or lactones and initiator was followed, in the examples, by observing the refractive index and the reaction was assumed to be complete when the index had reached a maximum.

*Example 1*

Two mols of epsilon-caprolactone (228 grams), one-half mol of castor oil (467 grams) and 15 cc. of acetic acid were stirred and heated at 100–172° C. until the refractive index had reached a maximum. This required 3¾ hours. The reaction product was stripped in a gooseneck still to 200° C. at 2.5 mm. Hg to yield 690 grams of a viscous liquid having a molecular weight of 1250 (theory 1390), a saponification equivalent of 198.2 (theory 198.5), a hydroxyl value of 3.08% and an index of refraction at $n$ 30/D of 1.4739.

The free hydroxyl groups of the epsilon-caprolactone-castor oil polyester were acetylated by heating for four hours at 110–125° C. with a 50% excess of acetic anhydride. All low boiling materials were then stripped off in a goose-neck still to 185° C. at 4 mm. The acetylated product was a viscous liquid having an acidity of 0.0211 cc. N base/g., a saponification equivalent of 153.7 (theory 151.6) and a refractive index at $n$ 30/D of 1.4668.

*Example 2*

Four mols of epsilon-caprolactone (456 grams), one-third mol of castor oil (311 grams) and 7.7 cc. of 2-ethylhexanoic acid (1% of charge) were stirred and heated at 140–199° C. until the refractive index had reached a maximum. This required 7.5 hours. The reaction product was a waxy solid having an acidity of 0.125 cc. N base/g., a saponification equivalent of 156.3 (theory 153.5), and a hydroxyl value of 2.05% (theory 2.12%).

The adduct thus obtained was acetylated by heating for four hours at 110–135° C. with a 50% excess of acetic anhydride. All low boiling materials were then stripped off in a goose-neck still to 197° C. at 3 mm. The acetylated product was a soft wax having an acidity of 0.058 cc. N base/g., and a saponification equivalent of 137 (theory 135).

*Example 3*

329 grams (0.8 mol) of 2-ethylhexyl ricinoleate, prepared as described in U.S. Patent 2,310,395 to Thomas F. Carruthers by alcoholysis of castor oil with 2-ethylhexanol, were stirred and heated with 91 grams (0.8 mol) epsilon-caprolactone and 0.5% by weight of propionic acid untill the refractive index had reached a maximum. This required 2.5 hours at 123–202° C. The product was a viscous liquid having an acidity of 0.146 cc. N base/g., a hydroxyl value of 3.6% (theory 3.24) and a saponification equivalent of 261.5 (theory 262.4).

400 grams of the 2-ethylhexyl ricinoleate-caprolactone adduct thus obtained were acetylated by heating for four hours at 100° C. with a 50% excess of acetic anhydride and then stripped in a goose-neck still to 177° C. at 4 mm. Hg. 492 grams of the product were obtained. It has an acidity of 0.0336 cc. N base/g., a viscosity of 52 cp. at 25° C. and a saponification equivalent of 191.1 (theory 188.9).

This polyester proved to be compatible with an 85% vinyl chloride-15% vinyl acetate copolymer "VYHH" and with nitrocellulose, as well as with 97% vinyl chloride-3% vinyl acetate copolymer "VYNW," as demonstrated later herein.

*Example 4*

0.8 mols of a mixture of beta-, gamma- and delta-methyl-epsilon-caprolactones (102 grams), 0.8 mols of tri-butyl citrate (288 grams) and 1% of acetic acid as catalyst were heated and stirred together until the refractive index ceased to rise. This required 3⅓ hours at 125–172° C. The reaction mixture was stripped in a goose-neck still to 150° C. at 6 mm. to leave 390 grams of residue product. The adduct was a liquid having an acidity of 0.260 cc. N base/g., an index of refraction at n 30/D of 1.4500, a viscosity of 110 cps. at 25° C., a saponification equivalent of 126.4 (theory 122.1) and a molecular weight of 465 (theory 488).

The adduct thus obtained was acetylated by heating for four hours at 126° C. with a 50% excess of acetic anhydride, then stripped in a goose-neck still to 178° C. at 4 mm. The acetylated adduct was a liquid having an acidity of 0.150 cc. N base/g., a viscosity of 103 cps. at 25° C. and a saponification equivalent of 107.4 (theory 106.1).

*Example 5*

One mol of epsilon-caprolactone (114 grams), one-third mol of castor oil (311 grams) and five grams of acetic acid (1.15%) were heated an stirred together until the refractive index had reached a maximum. This required 4½ hours at 162–170° C. 425 grams of adduct were obtained. It was a viscous liquid having an acidity of 0.125 cc. N base/g., an index of refraction at $n$ 30/D of 1.4747, a saponification equivalent of 212.2 (theory 212.6) and a hydroxyl value of 3.6% (theory 4.0%).

375 grams of the adduct thus obtained were acetylated by heating with 153 grams (50% excess) of acetic anhydride for four hours at 115–135° C., then stripping in a goose-neck still to 160° C. at 3 mm. The acetylated adduct was a liquid having an index of refraction at $n$ 30/D of 1.4682, an acidity of 0.0448 cc. N base/g., a saponification equivalent of 160.2 (theory 155.8) and nil hydroxyl value.

*Example 6*

Two mols of epsilon-caprolactone (228 grams) and one-third mol castor oil (311 grams) were heated and stirred together without a catalyst until the refractive index reached a maximum. This required four hours at 185–220° C. The adduct was a viscous liquid that had an acidity of 0.058 cc. N base/g., a hydroxyl value of 2.9% (theory 3.15%) and a saponification equivalent of 179.3 (theory 179.8).

300 grams of this adduct were mixed with 100 grams (50% excess) of propionic anhydride and heated for four hours at 120–135° C. The reaction mixture was stripped in a goose-neck still to yield 327 grams of residue product. The acylated adduct was a viscous liquid having an acidity of 0.032 cc. N base/g. and a saponification equivalent of 149.5 (theory 148.9).

*Example 7*

3-methyl-1,5-pentanediol diricinoleate was prepared by refluxing one mol of 3-methyl-1,5-pentanediol and two mols of ricinoleic acid in toluene and removing the water formed by means of a decanter. Reaction was complete in twenty-three hours at 132–181° C. The hydroxy ester was recovered as a residue by stripping in a goose-neck still to 191° C. at 3 mm. It was a viscous liquid having an acidity of 0.161 cc. N base/g., a saponification equivalent of 347.7 (theory 339.5) and a hydroxyl value of 4.2% (theory 5.0%).

One-third mol of the ester so prepared (225 grams), one mol of methyl-epsilon-caprolactone and 1.7 grams of acetic acid (0.5%) were heated and stirred until the refractive index had reached a maximum. This required six hours at 147–154° C. The reaction mixture was stripped in a goose-neck still to yield 353 grams of residue product. The adduct was a liquid having an acidity of 0.125 cc. N base/g., a saponification equivalent of 212.6 (theory 212.7) and a hydroxyl value of 2.7% (theory 3.2%).

300 grams of this adduct were reacted with 93 grams (50% excess) of propionic anhydride for three hours at 115–134° C., then stripped in a goose-neck still to 185° C. at 3 mm. 321 grams of residue product were obtained. The acylated adduct was a viscous liquid having an acidity of 0.050 cc. N base/g., a saponification equivalent of 176.5 (theory 173.1) and an index of refraction at $n$ 30/D of 1.4670.

*Example 8*

One mol of epsilon-caprolactone (114 grams), one mol of methyl-epsilon-caprolactone (128 grams), one-third mol of hydrogenated castor oil, a glyceryl tri-12-hydroxy stearate also nown as "Castorwax" (313 grams), and 3 cc. of acetic acid were heated and stirred together until the refractive index had reached a maximum. This required six hours at 188–204° C. After pot stripping to 200° C. at 3 mm., 546 grams of a residue product were obtained. The adduct had a hydroxyl value of 2.7% and an acidity of 0.054 cc. N base/g.

502 grams of the adduct so prepared were mixed with 120 grams (50% excess) of acetic anhydride and heated for four hours at 102–125° C. The reaction mixture was stripped to 180° C. at 5 mm. to yield 532 grams of residue product. The acetylated adduct had an acidity of 0.0213 cc. N base/g., nil hydroxyl value and a viscosity of 910 cps. at 25° C.

The acylated adducts of the various examples were all found to be compatible with and have a flexibilizing effect on vinyl chloride-vinyl acetate copolymers. Samples of a 97% vinyl chloride-3% vinyl acetate copolymer "VYNW," plasticized with the acylated adducts of Examples 1 to 8, were tested to compare them with dioctyl(di-2-ethylhexyl) phthalate, a well-known and successful commercial plasticizer, and to evaluate their pertinent characteristics. In the table immediately following, effectiveness is the concentration of plasticizer based on the total weight of resin plus plasticizer producing an elastomer having an elongation of 100% at 25° C. under a load of 1000 p.s.i. (applied at a constant rate in 74 seconds); the elongation is the increase in length at rupture with the sample at 25° C.; flex temperature ($T_F$) and ($T_4$) are indicative of pliability and are points corresponding to a stiffness modulus of 135,000 p.s.i. and 10,000 p.s.i., respectively, on a temperature-stiffness curve, the stiffness measurements being determined on a Clash and Berg Torsional Stiffness Tester as outlined in ASTM Method D1043–51 (Ind. Eng. Chem. 34, 1218, 1942); the brittle temperature is a measure of flexibility at low temperature and is determined by an impact test as defined in ASTM Method D746–52T; the percent water and oil extraction is the percentage weight loss of four mil films immersed in distilled water and in refined mineral oil, respectively, for a period of ten days at 25° C.; the durometer "A" hardness is a measure of resistance to indentation of an 0.25 inch specimen by a pin equipped with a truncated cone point as described in ASTM Method D676–49T; the SPI volatility in the percent weight loss of four to six mil films after contact with activated carbon granules for twenty-four hours at 70° C., as described in ASTM Method D1203–52T; the heat stability is a measure of the time in minutes required to reduce the blue light reflectance to 15% at 158° C.; and the "sweat-out" is a measure of exudation of the plasticizer on aging at room temperature. The values below "effectiveness" in the table are based on resin containing the effective percentage of plasticizer:

This embodiment of the invention is further illustrated by the following example:

Example 9

Two mols of epsilon-caprolactone (228 grams), one mol of ricinoleic acid (298 grams) and 5 cc. of acetic acid (1%) were heated and stirred together until the refractive index had reached a maximum. This required five hours at 148–154° C. After stripping in a gooseneck still to 155° C. at 2.5 mm., 516 grams of a residue product remained. The adduct was a liquid having a

| Example No. | 1 | 2 | 3 | 4 | 5 | 6 | 7 | 8 | Dioctyl Phthalate |
|---|---|---|---|---|---|---|---|---|---|
| Effectiveness, percent in VYNW | 43.3 | 40.5 | 38.5 | 40.4 | 42 | 41.9 | 43.4 | 36.7 | 38.5 |
| Tensile Strength, p.s.i. | 2,260 | 2,310 | 2,230 | 2,270 | 2,175 | 2,340 | 2,190 | 2,190 | 2,470 |
| Elongation, percent | 365 | 355 | 360 | 340 | 325 | 360 | 360 | 360 | 385 |
| ASTM Stiffness Modulus, p.s.i. | 580 | 670 | 970 | 75 | 475 | 700 | 850 | 550 | 760 |
| Flex-temperature (T_F), ° C. | −44 | −23 | −45 | −25 | −34 | −29 | −35 | −28 | −36 |
| (T_f) ° C | −17 | −1 | −9 | −4 | −7 | −5 | −8 | −4 | −9 |
| Brittle Temperature, ° C | −38 | −33 | −51 | −27 | −40 | −33 | −41 | −37 | −34 |
| Percent Extraction: | | | | | | | | | |
| Oil | 20.2 | 11.7 | 23.0 | 15.4 | 15.4 | 14.0 | 21.9 | 15.8 | 16.8 |
| Water | 0.3 | 0.6 | 0.2 | 2.3 | 0.6 | 0.6 | 0.1 | 0.2 | 0.1 |
| Shore Hardness ("A") | 61 | 68 | 71 | 64 | 66 | 66 | 62 | 62 | 65 |
| SPI Volatile loss, percent in 24 hrs. at 70° C. | 0.4 | 0.4 | 1.3 | 9.8 | 0.6 | 0.1 | 0.9 | 0.7 | 4.4 |
| Heat Stability: Initial Color, percent BLR | 82 | 86 | 82 | 71 | 81 | 88 | 56 | 76 | 88 |
| Min. at 158° C. to 15% BLR | 217 | 300 | 240 | 66 | 252 | 288 | 192 | 276 | 140 |
| Sweat-out: two weeks | None | None | None | None | None | None | Slight | None | None |

The data in this table demonstrates the compatibility of the lactone-hydroxy ester adducts, their good to excellent low temperature performance and heat stability, resistance to oil and water extraction and to loss by evaporation. These desirable characteristics are particularly surprising in the case of the castor oil adducts in view of the incompatibility of castor oil per se and of acetylated castor oil.

In accordance with another embodiment of the invention one or more lactones are reacted with a high molecular weight hydroxy carboxylic acid to form adducts having one or more terminal hydroxy groups and one or more terminal carboxylic acid groups, the number of such terminal groups corresponding to the number of hydroxy and carboxylic acid groups in the initial hydroxy carboxylic acid. These adducts may also be acylated and esterified to improve their resistance to extraction when used as plasticizers in vinyl and other resins.

The conditions of reaction are generally similar to those described with reference to the reaction of lactones with a hydroxy ester. Inasmuch as the adducts have at least one terminal hydroxy group and at least one terminal carboxylic acid group, they are capable of self-esterification upon further heating or, if desired, the terminal hydroxy group or groups may be acylated and the terminal carboxylic acid groups esterified to form terminal acyl and ester groups, respectively.

The adducts obtained by reaction of a lactone with a hydroxy carboxylic acid may conveniently be represented by the general formula

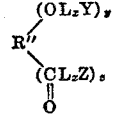

in which R″ is a residue of a high molecular weight hydroxy acid, Z is —OH or alkoxy, z is one or more, and the remaining symbols are as indicated previously, the L group in the

group having the terminal oxy group linked to the carbonyl carbon and the terminal carbonyl group of the lactone residue being linked either to Z or to the terminal oxy group of an adjacent lactone residue.

viscosity of 1625 cps. at 25° C., a titration equivalent of 749.5 (theory 526.7), a saponification equivalent of 170.4 (theory 175.6), an index of refraction at n 30/D of 1.4702 and a molecular weight of 820.

300 grams of the lactone-ricinoleic acid adduct prepared were dissolved in 250 cc. of toluene and heated for 42.5 hours at 165–177° C., the water from the reaction being removed by means of a decanter. The reaction mixture was stripped in a goose-neck still to 150° C. at 4 mm. and yielded 284 grams of a residue product having an acidity of 0.350 cc. N base/g., a viscosity of 5300 cps. at 25° C. and a molecular weight of 2060.

A mixture of one part by weight of the polyester thus obtained was mixed with two parts by weight of an 85% vinyl chloride–15% vinyl acetate copolymer "VYHH" resin cast from solution and dried. A clear, flexible film was obtained indicating excellent compatibility of the polyester with the resin. Additional tests indicated that the polyester is also compatible with nitrocellulose.

It is to be understood that many modifications will readily occur to those skilled in the art upon reading this description. All such modifications are intended to be included within the scope of the invention as defined in the appended claims.

I claim:

1. An adduct of an epsilon-caprolactone having up to three alkyl substituents and glyceryl ricinoleate.
2. An adduct of an epsilon-caprolactone having up to three alkyl substituents and lower alkyl ricinoleate.
3. An adduct of an epsilon-caprolactone having up to three alkyl substituents and 2-ethylhexyl ricinoleate.
4. An adduct of an epsilon-caprolactone having up to three alkyl substituents and a glycol diricinoleate.
5. An adduct of an epsilon-caprolactone having up to three alkyl substituents and 3-methyl-1,5-pentanediol diricinoleate.
6. An adduct of an epsilon-caprolactone having up to three alkyl substituents and glyceryl tri-12-hydroxy stearate.
7. An adduct of an epsilon-caprolactone having up to three alkyl substituents and tributyl citrate.
8. An adduct of an epsilon-caprolactone having up to three alkyl substituents and ricinoleic acid.
9. Method which comprises reacting a lactone having from six to eight carbon atoms in the lactone ring and up to three alkyl substituents with a hydroxy group-containing compound of the group consisting of ricinoleic acid, hydroxy stearic acid, citric acid, and the lower alkyl esters, glycol esters and glycerides thereof.

10. Method as defined in claim 9 wherein the lactone is unsubstituted epsilon-caprolactone.

11. Method as defined in claim 9 wherein the lactone is a methyl epsilon-caprolactone.

12. Method as defined in claim 9 wherein the hydroxy group-containing compound is ricinoleic acid.

13. Method as defined in claim 9 wherein the hydroxy group-containing compound is glyceryl ricinoleate.

14. Method as defined in claim 9 wherein the hydroxy group-containing compound is a lower alkyl ricinoleate.

15. Method as defined in claim 9 wherein the hydroxy group-containing compound is a glycol ricinoleate.

16. Method as defined in claim 9 wherein the hydroxy group-containing compound is a lower alkyl ester of citric acid.

17. Method as defined in claim 9 wherein the hydroxy group-containing compound is glyceryl trihydroxy stearate.

18. Method as defined in claim 9 wherein the reaction product is acylated with a lower alkyl carboxylic acid anhydride.

19. An adduct of a lactone having from six to eight carbon atoms in the lactone ring and up to three alkyl substituents with a hydroxy group-containing compound of the group consisting of ricinoleic acid, hydroxy stearic acid, citric acid, and the lower alkyl esters, glycol esters and glycerides thereof.

20. An adduct of a lactone having from six to eight carbon atoms in the lactone ring and up to three alkyl substituents with a hydroxy group-containing compound of the group consisting of ricinoleic acid, hydroxy stearic acid, citric acid, and the lower alkyl esters, glycol esters and glycerides thereof acylated with a lower alkyl carboxylic acid anhydride.

References Cited in the file of this patent

UNITED STATES PATENTS

| | | |
|---|---|---|
| 2,073,011 | Hubbuch | Mar. 9, 1937 |
| 2,260,295 | Carruthers | Oct. 28, 1941 |
| 2,562,900 | Fisher | Aug. 7, 1951 |
| 2,711,999 | Brandner et al. | June 28, 1955 |